(12) United States Patent
Liu et al.

(10) Patent No.: US 7,638,906 B2
(45) Date of Patent: Dec. 29, 2009

(54) ACTUATOR

(75) Inventors: Chien-Sheng Liu, Tainan County (TW); Jin-Yu Lee, Tainan (TW); Yung-Hsing Wang, Taichung (TW); Meng-Che Tsai, Kaohsiung (TW); Ying-Chi Chuo, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 185 days.

(21) Appl. No.: 11/532,095

(22) Filed: Sep. 14, 2006

(65) Prior Publication Data

US 2008/0024016 A1      Jan. 31, 2008

(30) Foreign Application Priority Data

Jul. 28, 2006      (TW) ............................... 95127677 A

(51) Int. Cl.
*H02K 33/00*      (2006.01)
(52) U.S. Cl. .......................................... 310/15; 310/12
(58) Field of Classification Search .................... 310/12, 310/13, 14, 15
See application file for complete search history.

(56) References Cited

U.S. PATENT DOCUMENTS

| | | | |
|---|---|---|---|
| 4,439,700 A | * | 3/1984 | Menzel et al. ................. 310/13 |
| 5,345,206 A | * | 9/1994 | Morcos ....................... 335/222 |
| 6,856,469 B2 | | 2/2005 | Yoneyama et al. |
| 6,975,195 B2 | * | 12/2005 | Rausch et al. ................ 335/220 |

FOREIGN PATENT DOCUMENTS

| | | |
|---|---|---|
| JP | 2005-128405 | 5/2005 |
| LB | 2005/060242 A1 | 6/2005 |
| TW | M260054 | 3/2005 |

OTHER PUBLICATIONS

"Office Action of Taiwanese counterpart application", issued on Jun. 29, 2009, p1-p6.

* cited by examiner

*Primary Examiner*—Nguyen N Hanh
(74) *Attorney, Agent, or Firm*—Jianq Chyun IP Office

(57) ABSTRACT

An actuator including at least one moving body, at least one fixed body and a connecting member is provided. The moving body is suitable for moving along a direction, and includes at least one coil. In addition, the fixed body includes a permanent magnet and a yoke, wherein the coil is disposed between the permanent magnet and the yoke, and the polarity direction of the permanent magnet is parallel to the moving direction of the moving body. Furthermore, the connecting member is used for connecting the moving body and the fixed body. The actuator meets the requirements of miniaturization, low power consumption and low cost.

11 Claims, 7 Drawing Sheets

ACTUATOR

CROSS-REFERENCE TO RELATED APPLICATION

This application claims the priority benefit of Taiwan application serial no. 95127677, filed on Jul. 28, 2006. All disclosure of the Taiwan application is incorporated herein by reference.

BACKGROUND OF THE INVENTION

1. Field of Invention

The present invention relates to an actuator. More particularly, the present invention relates to an actuator applicable to lens modules.

2. Description of Related Art

Various high-tech products have been developed with the popularity of modern science and technology and the improvement of the living standard, among which the most representative ones are digital information products, such as mobile phones and digital cameras. In recent years, as digital cameras are integrated into mobile phones, camera phones have become the dominant products in the mobile phone market, and various camera phones are available in the market. With the increase of the added value of products and driven by the consumption models of consumers, cameras in mobile phones are developing toward the trend of high image quality, low power consumption, low cost and miniaturization, and actuators in lens modules of the cameras are key components influencing the overall quality.

Currently, actuators applied in miniature lens modules are roughly classified into two categories according to the moving modes of the actuators. The actuators in the first category provide rotary power to drive the lens modules, and the direction of the rotating axis is parallel to the optical axis. The actuators in the second category provide translational power to drive the lens modules, and the direction of translation is parallel to the optical axis.

More particularly, the actuators of the first category need additional mechanisms which convert transmission direction to enable the lens modules to move parallel to the optical axis. The advantage of the actuators is that no additional power is needed to lo maintain the specific position after the position is reached. However, the structure of the actuators has many components, and is complicated, which is disadvantageous for the reduction of the size and cost. Common actuators of this category include step motors. As described above, because being disadvantageous for the reduction of size and cost, the kind of actuators are gradually losing their market share.

In addition, the actuators of the second category provide power parallel to the moving direction, so additional mechanisms which convert transmission direction are not required. Compared to the actuators of the first category, they may effectively reduce the number of components and the size. Common actuators of this category include voice coil actuators, piezoelectric actuators, and liquid lenses, etc. The piezoelectric actuators require high manufacturing cost and power consumption, and are disadvantageous in market competition and popularization. Similarly, the liquid lenses have to be driven with high voltage sources, and are disadvantageous in market competition and popularization as well. Compared to the two types of actuators described above, the voice coil actuators have lower manufacturing cost and high positioning precision, and are advantageous in the market. However, if the voice coil actuators are to be maintained at the specific position after they are positioned, continuous power supply and repetitive control are required, that lead to the waste of power and the reduction of the battery life of portable devices. Moreover, the voice coil actuators have low anti-shock performance, and are disadvantageous in long-time positioning.

To make actuators in lens modules more suitable for portable devices (such as camera phones), the trend now is miniaturization, low power consumption, and low cost. As shown in FIG. 1, U.S. Pat. No. 6,856,469 discloses a lens driving device 100, which is characterized in that a magnetic element 110, a flexible element 120 and a spring element 130 are arranged in a direction parallel to the optical axis, and the clamping action for positioning is performed by using the magnetic force of the magnetic element 110 and a magnet 140 together with the spring element 130. However, as the displacement of the magnetic element 110 generated with the change of the magnetic force is nonlinear, it is difficult to control the positioning. Furthermore, as the magnetic force between the magnetic element 110 and the magnet 140 is great, a high current is required to balance the magnetic force, which is also disadvantageous for the miniaturization of the device.

In addition, as shown in FIG. 2A and FIG. 2B, European Patent No. 2005/060242A1 discloses a camera apparatus, which is characterized in that a magnetic element 210, a coil 220, a rotating axis 230 and an elastic element form a clamping mechanism 200, and the magnetic attraction force between the magnetic element 210 and the coil 220 and the restoring force of the elastic element are used to enable the clamping element 240 to release or clamp a focus driving part 250 at specific positions. However, as the apparatus has a large number of elements and a complicated structure, it is difficult to assemble, and is disadvantageous in the miniaturization of the device.

FIG. 3 is an actuator 300 disclosed in Japanese Patent No. 2005-128405, which is characterized in that a spring plate 310 and a spring plate 320 specially designed to be arranged vertically are used to provide precise movement of the lens module and reduce the friction during the movement, and the spring plates may be regarded as the extension of a coil, and serve as the conductor for the flow of the current in two ends of the coil. Moreover, a groove 340 in an outer frame 330 and a flange 360 on a lens module 350 bear the collision or vibration caused by the contact of a moving body and a fixed body, thereby controlling the deviation of the moving body to the optical axis within an acceptable range, so as to prevent the over rotation of the moving body from influencing other structures.

Furthermore, it should be noted that the actuator structures of the conventional technologies described above all use radially magnetized permanent magnets (i.e., permanent magnets having radial magnetic polarity direction). For example, Japanese Patent No. 2005-128405 shown in FIG. 3 uses a plurality of radially magnetized permanent magnets 370 and U-shaped yoke 380. However, the current mass production technology of permanent magnets cannot radially magnetize a permanent magnet with an enclosed shape to a single polarity, so the permanent magnet with an enclosed shape has to be cut into several blocks, which will be then radially magnetized individually. Thus, the manufacturing cost and the difficulty in assembling is increased, and the availability of the magnetic energy product is poor. In addition, in order to improve the availability of the magnetic energy product, the section of the yoke has to be designed to a U-shape, so the manufacturing cost of the yoke is high. Conventional actuator structures using radially magnetized permanent magnets are difficult to manufacture and assemble, and are disadvantageous in the reduction of cost.

SUMMARY OF THE INVENTION

The present invention refers to an actuator meeting the requirements of miniaturization, low power consumption, and low cost.

The present invention provides an actuator, which mainly comprises at least one moving body, at least one fixed body, and a connecting member. The moving body is suitable for moving along a direction, and the moving body comprises at least one coil. Furthermore, the fixed body comprises a permanent magnet and a yoke, wherein the coil is disposed between the permanent magnet and the yoke, and the polarity direction of the permanent magnet is parallel to the moving direction of the moving body. The connecting member connects the moving body and the fixed body.

In one embodiment of the present invention, the moving body comprises a first coil and a second coil, which are disposed adjacent to two ends with different polarities of the permanent magnet respectively, and the first coil and the second coil are suitable for being applied with currents of different directions.

In one embodiment of the present invention, the first coil and the second coil, for example, may be connected in series, and the first coil and the second coil have opposite winding directions.

In one embodiment of the present invention, the fixed body further comprises two assistant yokes, which are disposed on two ends with different polarities of the permanent magnet respectively.

In one embodiment of the present invention, the actuator comprises, for example, a first moving body and a second moving body, wherein the first moving body and the second moving body are driven by corresponding coils respectively and move along the direction.

In one embodiment of the present invention, the design that at least two moving bodies are used and each of the moving bodies which comprises at least two coils may be used, such that the actuator has a plurality of moving bodies, and each of the moving bodies has a plurality of coils.

In one embodiment of the present invention, the moving body may further comprise a sleeve and a lens module, wherein the lens module is disposed in the sleeve, and the coil surrounds the sleeve.

In one embodiment of the present invention, the yoke, for example, surrounds the sleeve, and is disposed between the sleeve and the coil, and the permanent magnet surrounds the coil.

In one embodiment of the present invention, the actuator may further comprise a housing, which covers the moving body, the fixed body, and the connecting member, and the housing has an opening to expose the moving body.

In one embodiment of the present invention, the actuator may further comprise a guiding member, which is disposed at the opening of the housing and is connected to the moving body, and a guiding structure with its components fitting with one another may be disposed between the guiding member and the housing. The guiding structure is, for example, the fitting of grooves and flanges.

In one embodiment of the present invention, the permanent magnet is, for example, a circular enclosed structure formed one-piece. In addition, the connecting member may be an elastic body or other connecting mechanisms.

In view of the above, the present invention utilizes the electromagnetic principle together with the design of mechanisms and magnetic structures to eliminate the problems of existing voice coil actuators concerning power consumption and anti-shock, and provides an actuator meeting the requirements of miniaturization, low power consumption, and low cost.

In order to make the aforementioned and other objects, features and advantages of the present invention comprehensible, preferred embodiments accompanied with figures are described in detail below.

DESCRIPTION OF EMBODIMENTS

The actuator of the present invention mainly includes components such as a moving body, a fixed body, and a connecting member. The moving body includes a coil. The fixed body includes a permanent magnet and yoke. The connecting member connects the moving body and the fixed body, and it is important that the polarity direction of the permanent magnet has to be parallel to the moving direction of the moving body. Thus, utilizing the electromagnetic principle, by passing the magnetic lines of force of the permanent magnet and the yoke through the coil carrying a current, forces may be generated along the polarity direction of the permanent magnet to drive elements such as the lens module, so as to meet the requirements of miniaturization, low power consumption and low cost. The present invention is illustrated below with examples of an actuator applied in a lens module. However, the illustration is not used to limit the usage of the actuator of the present invention, and the actuator may be applied in any suitable driving system without departing from the spirit and scope of the present invention.

Figure 1:
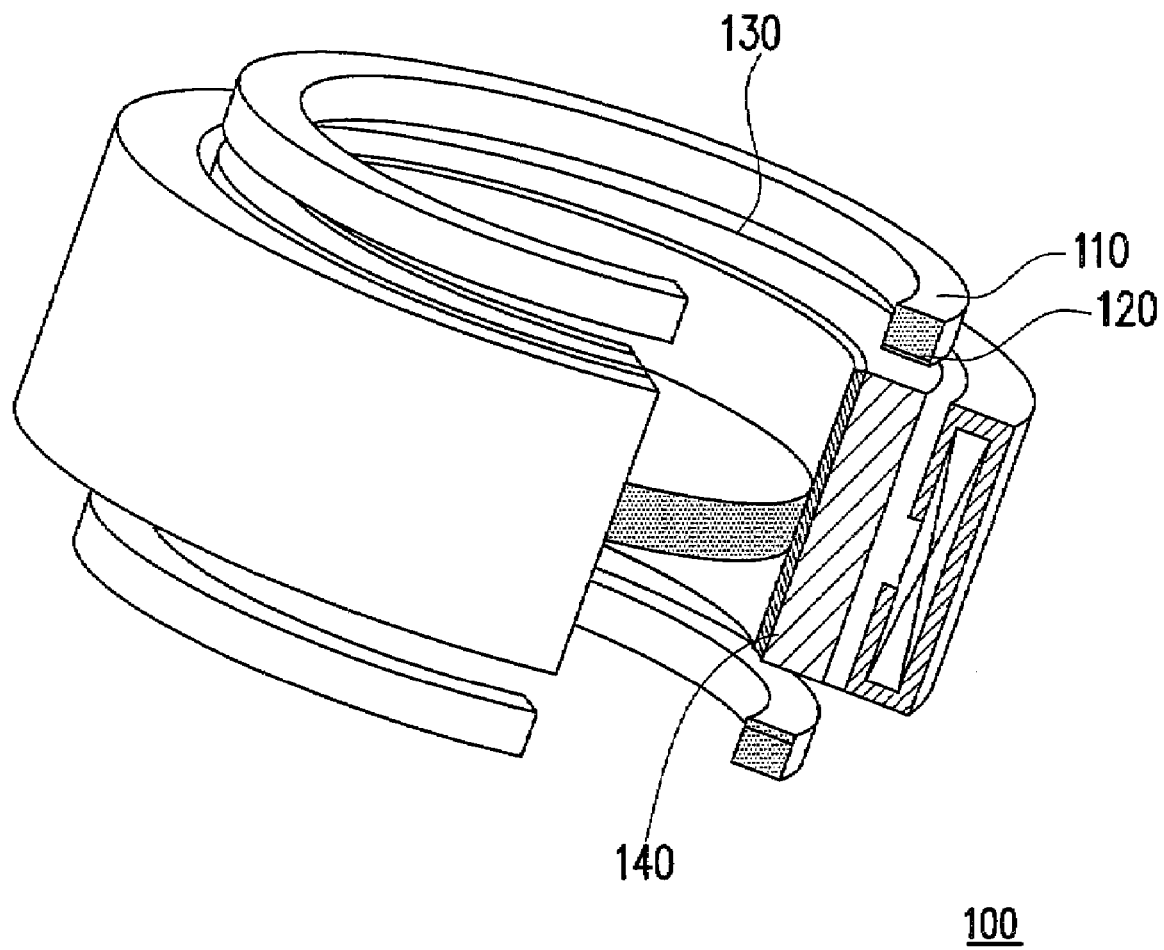
FIG. 1, FIG. 2A, FIG. 2B, and FIG. 3 are various conventional designs of actuators.
Figure 2A:
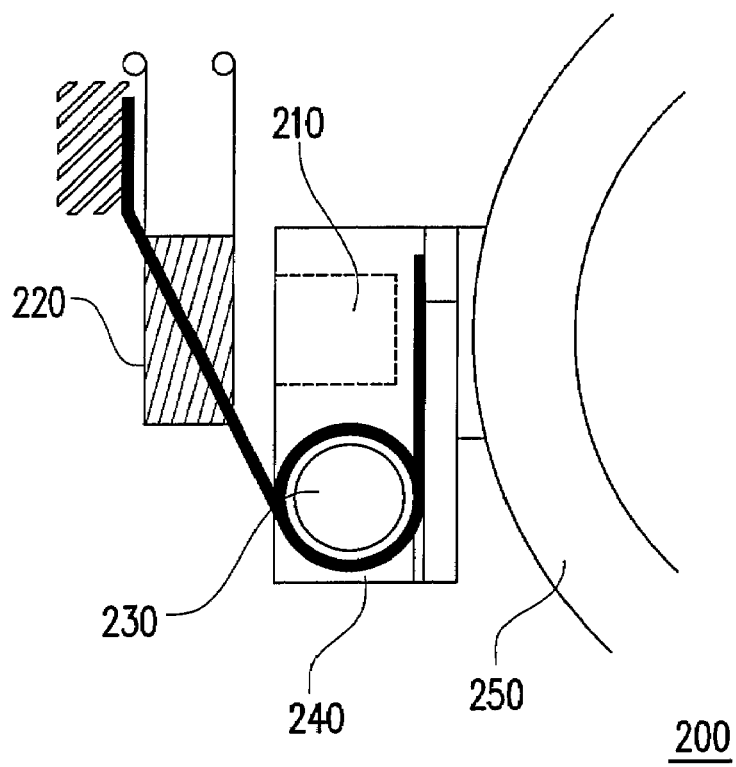
Figure 2B:
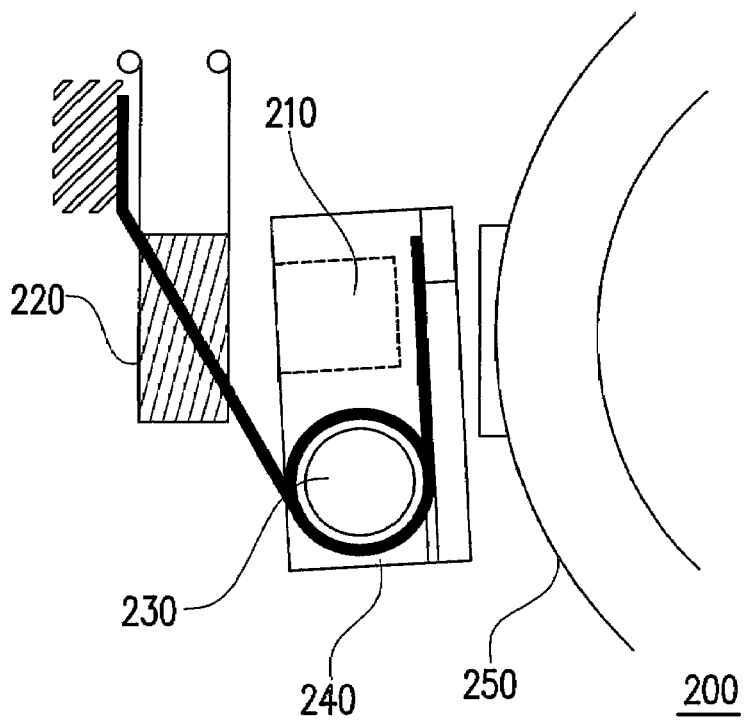
Figure 3:
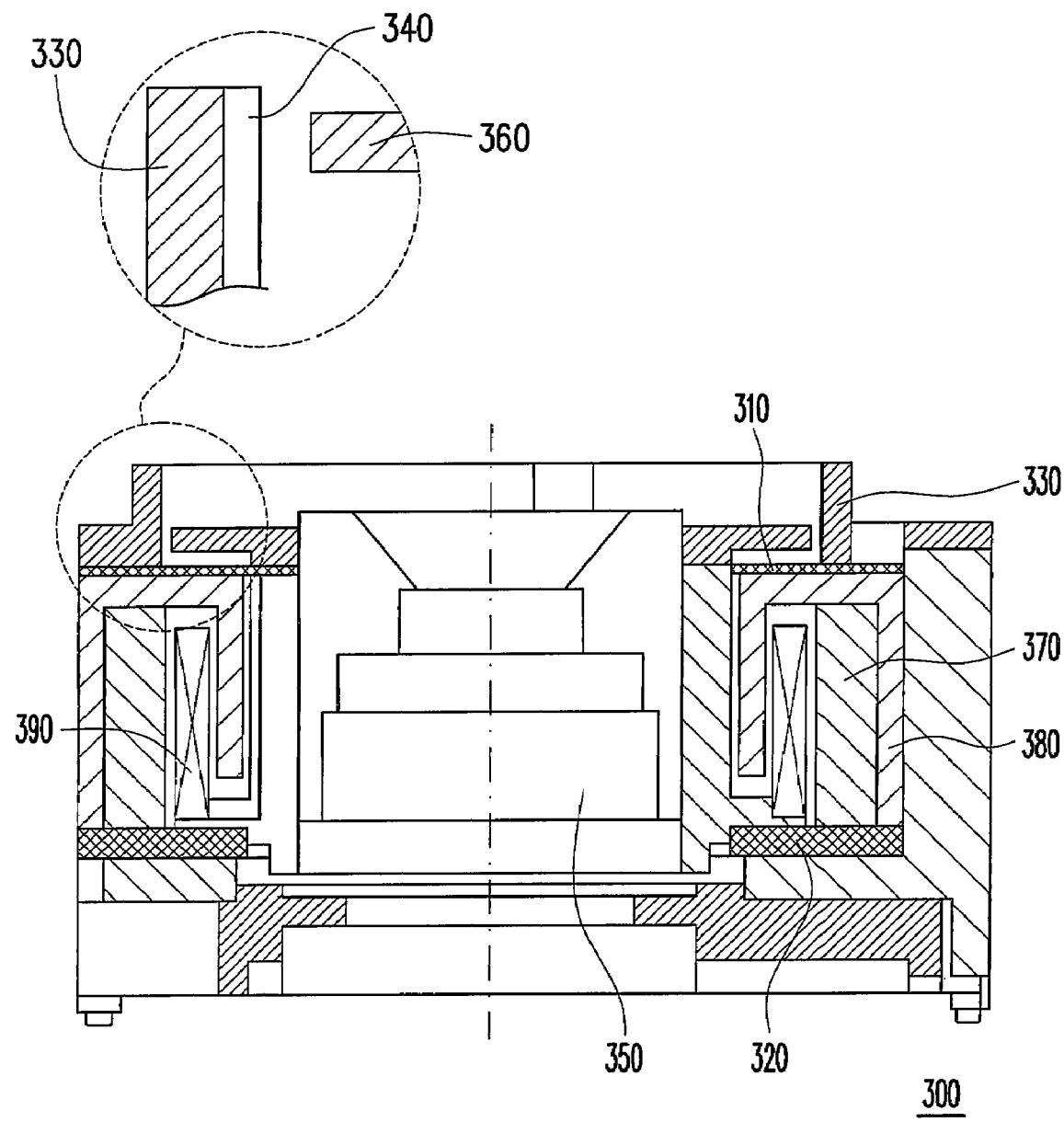
Figure 4:
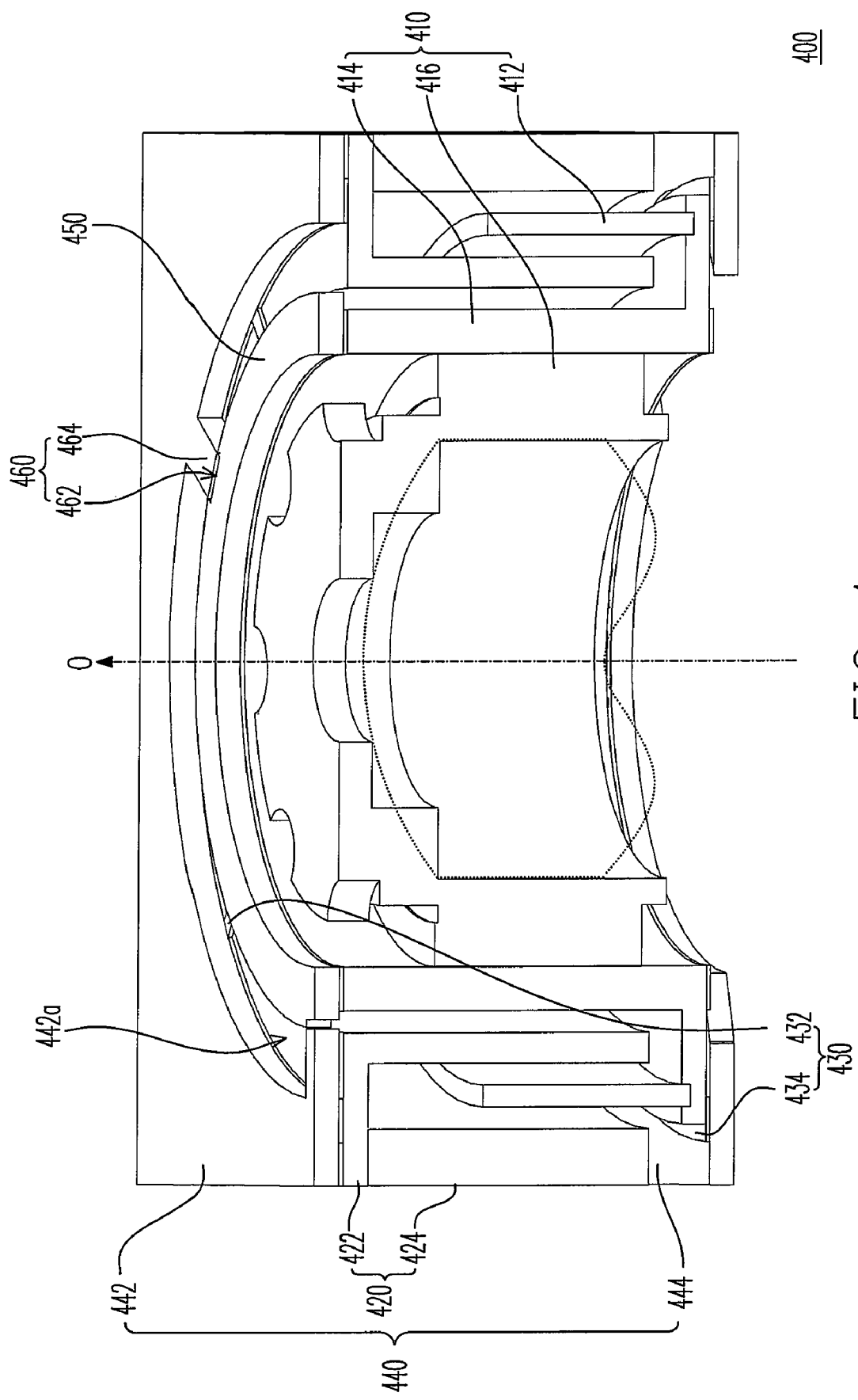
FIG. 4 is an actuator according to a preferred embodiment of the present invention.
Figure 5:
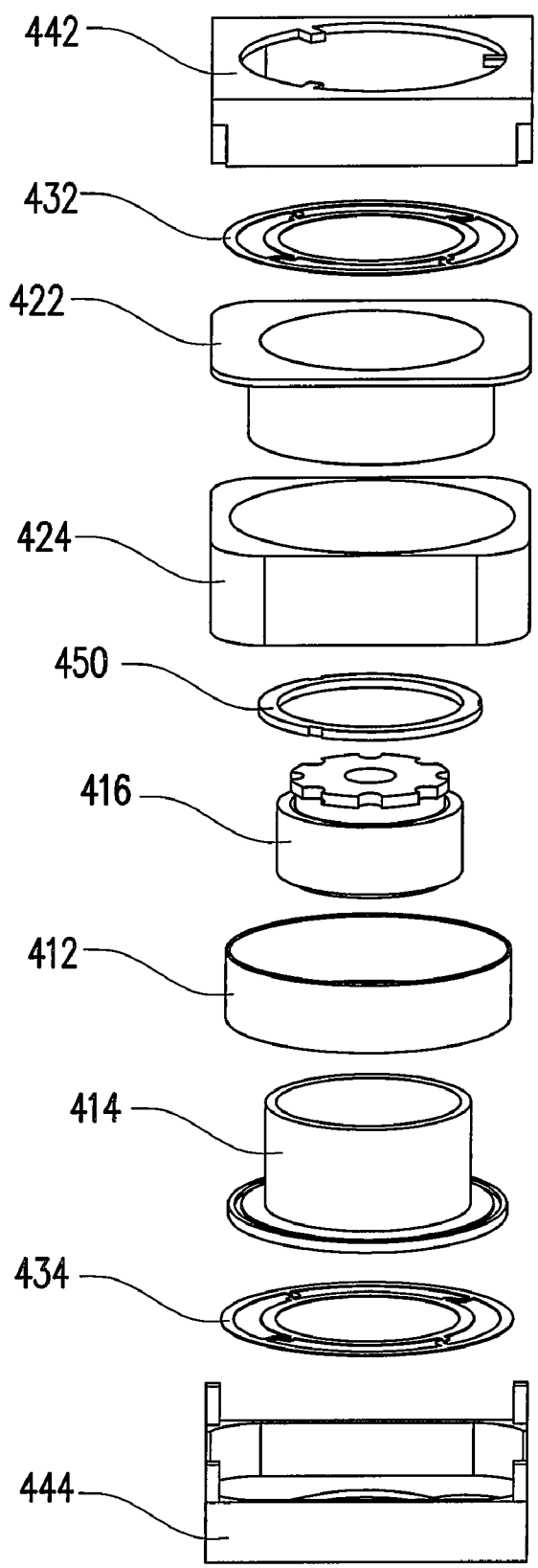
FIG. 5 is an exploded view of the actuator of FIG. 4.

FIG. 4 is an actuator according to a preferred embodiment of the present invention, and FIG. 5 is an exploded view of the actuator. Referring to FIG. 4 and FIG. 5 together, the actuator 400 of this embodiment mainly includes a moving body 410, a fixed body 420, a connecting member 430 and a housing 440. The moving body 410 includes a coil 412 and a sleeve 414, which are used to drive a lens module 416 to move in a direction parallel to the optical axis of the lens module 416. The lens module 416 is disposed in the sleeve 414, and the coil 412 surrounds the sleeve 414.

Referring to FIG. 4 and FIG. 5, the fixed body 420 includes a yoke 422 and a permanent magnet 424, which are used to generate the magnetic field. In this embodiment, for example, the yoke 422 surrounds the sleeve 414, and is disposed between the sleeve 414 and the coil 412, and the permanent magnet 424 surrounds the coil 412. In addition, the connecting member 430 may include an elastic member 432 and an elastic member 434, which are used to connect the moving body 410 and the fixed body 420 and to provide an elastic force. Certainly, in other embodiments, other existing connecting mechanisms may be used as the connecting member 430. In addition, the housing 440 includes an upper housing 442 and a lower housing 444, which cover the moving body 410, the fixed body 420 and the connecting member 430, so as to fix and protect the above components. The upper housing 442 has an opening 442a to expose the moving body 410.

Figure 6:
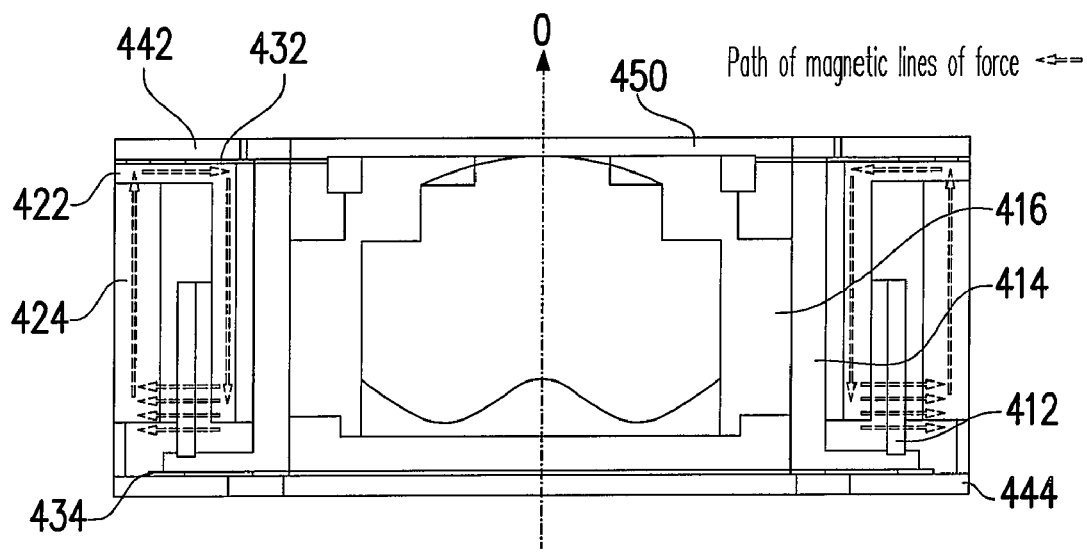
FIG. 6 is a sectional view of the actuator of FIG. 4.

FIG. 6 is a sectional view of the actuator 400. The detailed operating principle of the actuator 400 is described as follows. Referring to FIG. 4-FIG. 6, the magnetizing direction of the permanent magnet 424 is parallel to the direction of the optical axis O, and the interaction between the yoke 422 and the permanent magnet 424 generates magnetic lines of force perpendicular to the optical axis O. When the magnetic lines of force pass through the coil 412 carrying a current, a force $F_1$ parallel to the optical axis O is generated because of the electromagnetic voice coil principle, and the force $F_1$ drives the moving body 410 moving along a direction parallel to the optical axis O together with the elastic forces of the elastic member 432 and the elastic member 434. In addition to connecting the moving body 410 and the fixed body 420 and providing the elastic force, the elastic pre-pressure of the elastic member 432 and the elastic member 434 may also improve the anti-shock performance of the actuator 400. Therefore, the design is advantageous for the actuator 400 to be applied to the precise positioning, for example, the auto focusing of camera phones.

Referring to FIG. 4, the actuator 400 further includes a guiding member 450 disposed in the opening 442a of the upper housing 442 and connecting the moving body 410. In this embodiment, a guiding structure 460 with its components fitting with one another may be disposed between the guiding member 450 and the upper housing 442, which, for example, includes a groove (or a flange) 462 on the guiding member 450 and a flange (or a groove) 464 at the opening 442a of the upper housing 442. The guiding structure 460 is used to guide the moving body 410 to move along the direction parallel to the optical axis O, so as to prevent the inclination of the moving body 410 or the collision between the moving body 410 and the housing 440 (or/and the fixed body 420). Certainly, the guiding structure applicable to the present invention is not limited to the groove-flange fitting, and other structures capable of achieving the same performance shall fall into the scope of protection of the present invention.

It should be noted that the present invention changes the polarity direction of the permanent magnet from the conventional direction perpendicular to the optical axis O (i.e., the radial direction as disclosed in JP Patent 2005-128405) to the direction parallel to the optical axis O (i.e., the axial direction). The current mass production technology of permanent magnets cannot radially magnetize a permanent magnet with an enclosed shape to a single polarity, so the permanent magnet with an enclosed shape has to be cut into several blocks, which will be then radially magnetized individually. Thus, the manufacturing cost and the difficulty in assembling is increased, and the availability of the magnetic energy product is poor. As the present invention changes the magnetizing direction of the permanent magnet from the radial direction to the axial direction, the defects described above are eliminated. Moreover, the current mass production technology of permanent magnets may axially magnetize a permanent magnet with an enclosed shape to a single polarity, and the permanent magnet 424 as shown in FIG. 4-FIG. 6 can be a circular enclosed structure formed one-piece. Therefore, the present invention not only reduces the manufacturing cost and the difficulty in assembling, and improves the availability of the energy product, but also reduces the size of the actuator when it is required to output the same force.

Figure 7:
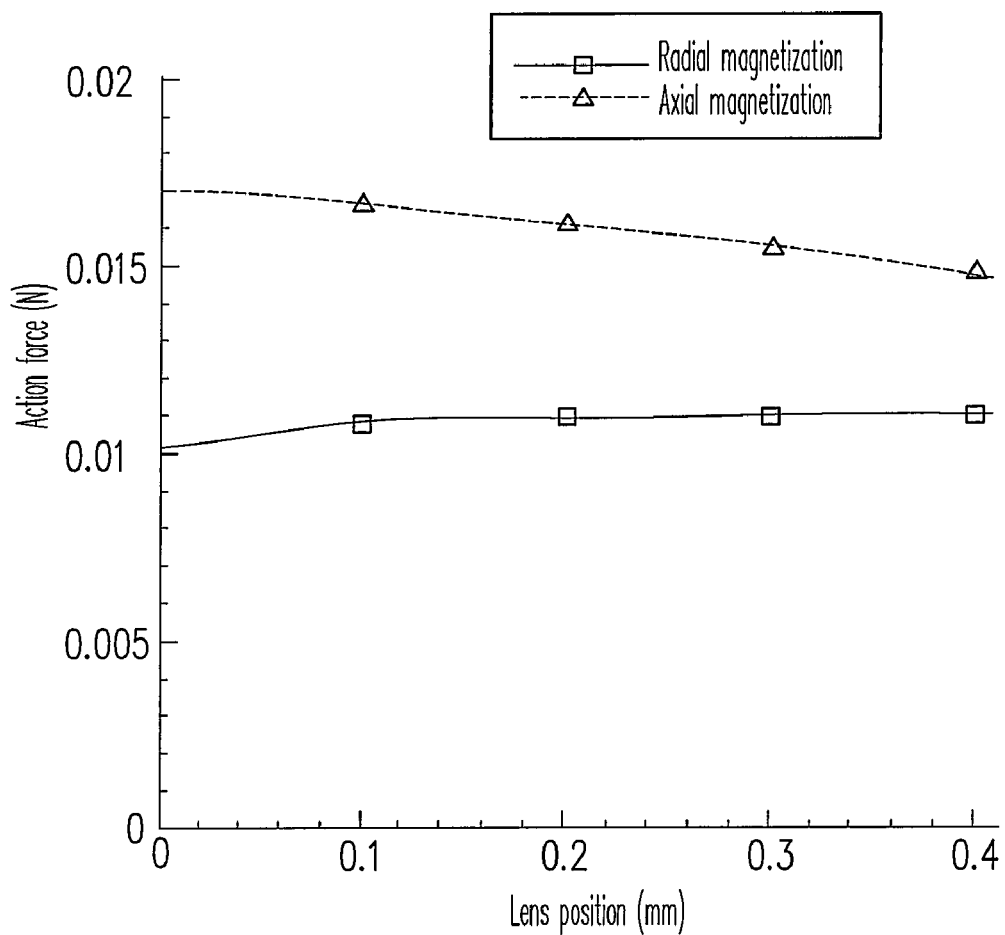
FIG. 7 is the force output results of actuators of the same designed size but using permanent magnets of different magnetizing directions, obtained by simulating according to the magnetic path.

FIG. 7 is the force output results of actuators of the same designed size but using permanent magnets of different magnetizing directions, obtained by simulating according to the magnetic path. As known from the data of FIG. 7, the actuator using axially magnetized permanent magnet has a force output greatly higher than that of the actuator using radially magnetized permanent magnet by about over 35%.

Furthermore, the manufacturing and design of the yoke of the present invention Is obviously different from the conventional art because of the change of the polarity direction of the permanent magnet. As for radially magnetized permanent magnet, to obtain the best availability of the magnetic energy product, the yoke shall be designed to have a U-shaped section. The manufacturing cost of this kind of yokes (e.g., manufactured with the technology disclosed in JP Patent 2005-128405) is high. On the contrary, as shown in FIG. 6, as for the axially magnetized permanent magnet 424, the yoke 422 does not need to be designed to have the U-shaped section. Instead, the yoke 422, for example, has an L-shaped section, and may obtain the best availability of the magnetic energy product. Therefore, the shape of the yoke 422 is simple, and the manufacturing cost thereof is low.

In addition to the embodiment described above, the present invention may be modified to an actuator having a plurality of moving bodies and a plurality of fixed bodies according to the principle and structure of the above embodiment, wherein the moving bodies may move along directions parallel to the polarity direction of the permanent magnet respectively. Other embodiments are given below to describe the present invention, while their components similar to those of the above embodiment will not be described again, and the detailed description to the components is as shown in the illustration of the above embodiment.

Figure 8:
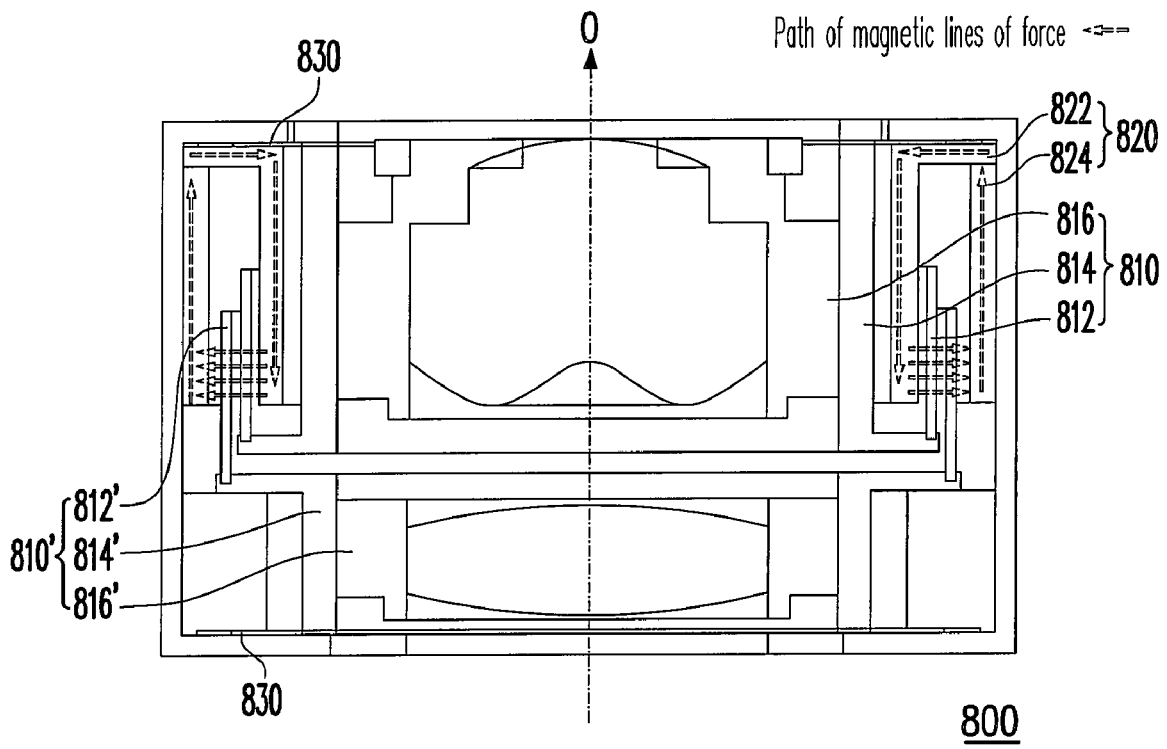
FIG. 8 and FIG. 9 are various actuators according to other embodiments of the present invention.

FIG. 8 is an actuator according to another embodiment of the present invention. The actuator 800 includes a first moving body 810 and a second moving body 810', which are driven by corresponding coils 812 and 812' respectively and move along the polarity direction of a permanent magnet 824. More particularly, the first moving body 810 includes a coil 812 and a sleeve 814, which are used to drive a lens module 816 to move along a direction parallel to the optical axis O. In addition, the second moving body 810' includes a coil 812' and a sleeve 814', which are used to drive a lens module 816' to move along a direction parallel to the optical axis O. A fixed body 820 includes a yoke 822 and a permanent magnet 824, which are used to generate a magnetic filed. The coils 812 and 812' are disposed between the yoke 822 and the permanent magnet 824, and adjacent to one magnetic end of the permanent magnet 824.

Referring to FIG. 8 again, according to the electromagnetic voice coil principle, when the magnetic lines of force generated by the yoke 822 and the permanent magnet 824 pass through the coils 812 and 812' carrying currents, forces $F_2$ and $F_3$ parallel to the optical axis O are generated to the coils 812 and 812' respectively. The two forces and the elastic force of the connecting member 830 drive the first moving body 810 and the second moving body 810' to move opposite to each other along the direction parallel to the optical axis O. As this embodiment may have at least two lens modules, for example, lens modules 816 and 816', different functions may be integrated at the same time, in addition to the auto focusing of cameras of mobile phones, also applicable to the zoom in/out of cameras of mobile phones.

Figure 9:
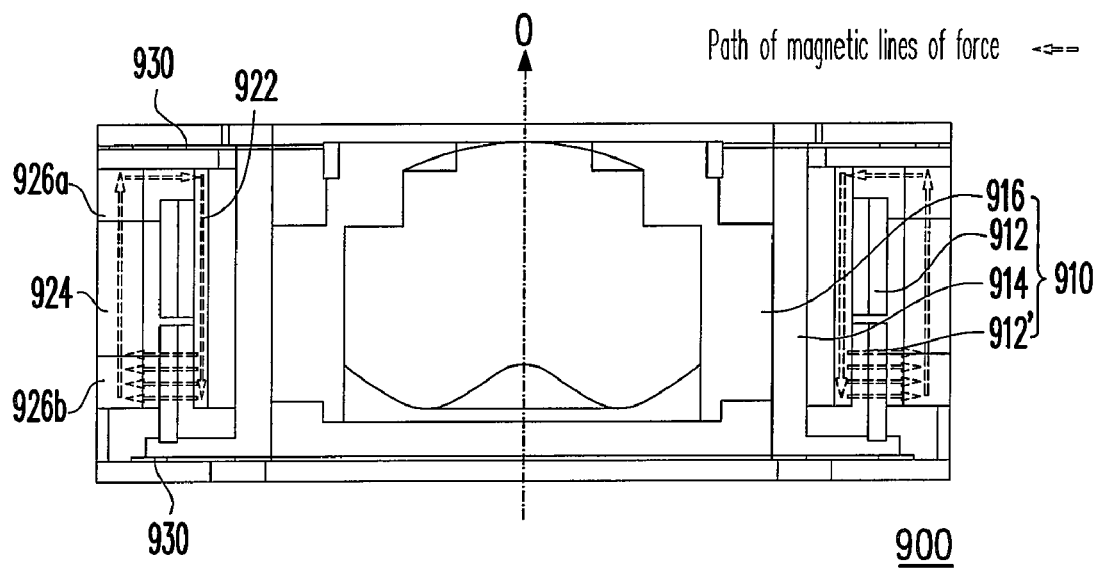

FIG. 9 is an actuator according to another embodiment of the present invention. A moving body 910 of the actuator 900 has a first coil 912 and a second coil 912', which are disposed adjacent to two ends of different polarities of the permanent magnet 924, and the first coil 912 and the second coil 912' are suitable for being applied with currents of different directions. In actual manufacturing, for example, a same wire is used to form the first coil 912 and the second coil 912' by winding, and the first coil 912 and the second coil 912' have opposite winding directions.

More particularly, the first coil 912 and the second coil 912' have the same axis, and are arranged vertically between the yoke 922 and the permanent magnet 924. The magnetizing direction of the permanent magnet 924 is parallel to the direction of the optical axis O. Moreover, in this embodiment, to improve the function of the magnetic lines of force, assistant yokes 926a and 926b may further be disposed on two ends of different polarities of the permanent magnet 924. The interaction of the yoke 922, the assistant yoke 926a, the assistant yoke 926b and the permanent magnet 924 generates two groups of magnetic lines of force in two opposite directions perpendicular to the optical axis O. According to the electromagnetic voice coil principle, after the two groups of magnetic lines of force of opposite directions pass through the first coil 912 and the second coil 912' carrying currents in opposite directions, two forces $F_4$ and $F_5$ in the same direction and parallel to the optical axis O are generated. The resultant of the two forces and the elastic force of the connecting element 930 drive the sleeve 914 and the lens module 916 of the moving body 910 to move in the direction parallel to the optical axis O. The feature of this embodiment is that two groups of magnetic lines of force of opposite directions perpendicular to the optical axis O are applied effectively. Therefore, the performance of the actuator is improved.

Certainly, the present may also combine the two designs of actuators shown in FIG. 8 and FIG. 9, such that each actuator has a plurality of moving bodies and/or a plurality of fixed bodies, and each of the moving bodies may have at least two coils. Detailed structure of the combined design is omitted here. Furthermore, it should be noted that the positions of the coil, yoke, and permanent magnet are not fixed. For example, the positions of the yoke and the permanent magnet may be exchanged, and they may still achieve the effect of driving the moving body to move along the direction parallel to the optical axis. In addition, the coil may also be placed in the fixed body, while the yoke and the permanent magnet may also be placed in the moving body, and they may still achieve the effect of driving the moving body to move along the direction parallel to the optical axis.

Through the mechanisms, magnetic paths and precise control designs, the force output of the actuator may be improved significantly, and the power consumed during the operation of the actuator may be reduced. Moreover, as the force output of the actuator is improved, the size of the actuator may be reduced, and the components of the actuator are easier to fabricate. Therefore, the actuator of the present invention can realize the objects of miniaturization, low power consumption, and low cost.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An actuator, comprising:
    at least one moving body, suitable for moving along a direction, wherein each moving body comprises at least a first coil and a second coil;
    at least one fixed body, comprising a permanent magnet and a yoke, wherein the first coil and the second coil are disposed between the permanent magnet and the yoke, and a magnetic polarity direction of the permanent magnet is parallel to a moving direction of the moving body; and
    a connecting member, connecting the moving body and the fixed body, wherein the first coil and the second coil are respectively disposed adjacent to two ends having different polarities of the permanent magnet, and the first coil and the second coil are suitable for being applied with currents of different directions.

2. The actuator as claimed in claim 1, wherein the first coil and the second coil of each moving body are connected in series, and the first coil and the second coil have opposite winding directions.

3. The actuator as claimed in claim 1, wherein the fixed body further comprises two assistant yokes respectively disposed on two ends having different polarities of the permanent magnet.

4. The actuator as claimed in claim 1, comprising a first moving body and a second moving body, wherein the first moving body and the second moving body are driven by corresponding coils to move along the direction.

5. The actuator as claimed in claim 1, wherein the moving body further comprises a sleeve and a lens module, the lens module is disposed in the sleeve, and the coil surrounds the sleeve.

6. The actuator as claimed in claim 5, wherein the yoke surrounds the sleeve, and is disposed between the sleeve and the first coil and the second coil, and the permanent magnet surrounds the first coil and the second coil.

7. The actuator as claimed in claim 1, further comprising a housing covering the moving body, the fixed body and the connecting member, and the housing has an opening to expose the moving body.

8. The actuator as claimed in claim 7, further comprising a guiding member disposed in the opening of the housing and connecting the moving body, and a guiding structure with its components fitting with one another is disposed between the guiding member and the housing.

9. The actuator as claimed in claim 8, wherein the guiding structure comprises fitting of grooves and flanges.

10. The actuator as claimed in claim 1, wherein the permanent magnet is a ring shaped structure formed in one-piece.

11. The actuator as claimed in claim 1, wherein the connecting member is an elastic body.

* * * * *